United States Patent
Ishitoko et al.

(10) Patent No.: US 6,720,714 B2
(45) Date of Patent: Apr. 13, 2004

(54) VIBRATING GYROSCOPE

(75) Inventors: Nobuyuki Ishitoko, Toyama (JP);
Katsumi Fujimoto, Toyama-ken (JP);
Yoshiji Okamoto, Omihachiman (JP);
Hirofumi Tanaka, Toyama-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 60 days.

(21) Appl. No.: 09/950,524

(22) Filed: Sep. 10, 2001

(65) Prior Publication Data

US 2002/0047502 A1 Apr. 25, 2002

Related U.S. Application Data

(63) Continuation of application No. 09/086,025, filed on May 28, 1998, now Pat. No. 6,288,478.

(30) Foreign Application Priority Data

May 28, 1997 (JP) ............................. 9-138303
May 28, 1997 (JP) ............................. 9-138304
Oct. 21, 1997 (JP) ............................. 9-288747

(51) Int. Cl.$^7$ .............................................. H01I 41/08
(52) U.S. Cl. ...................................................... 310/351
(58) Field of Search ..................... 310/321, 330–332, 310/366, 348, 351–356, 329

(56) References Cited

U.S. PATENT DOCUMENTS

| | | | | |
|---|---|---|---|---|
| 2,155,035 A | | 4/1939 | Bieling ................ 310/352 X |
| 2,410,825 A | * | 11/1946 | Lane ...................... 310/351 |
| 3,054,915 A | * | 9/1962 | Houck ................... 310/351 |
| 3,263,103 A | * | 7/1966 | Fraser et al. ........... 310/352 |
| 3,566,164 A | * | 2/1971 | Boillat .................. 310/351 |
| 3,751,692 A | * | 8/1973 | Choffat ................. 310/351 |
| 3,906,249 A | * | 9/1975 | Gibert et al. .......... 310/351 |
| 4,025,806 A | * | 5/1977 | Weber ................... 310/351 |
| 4,089,092 A | * | 5/1978 | Jeanguenin et al. ... 310/352 X |
| 4,183,126 A | | 1/1980 | Ikeno et al. ........... 310/352 X |
| 4,415,826 A | | 11/1983 | Kreutzev et al. ...... 310/353 X |
| 4,608,509 A | * | 8/1986 | Yamamoto et al. ... 310/352 X |
| 4,639,632 A | * | 1/1987 | Nakata et al. ........... 310/351 |
| 4,695,756 A | * | 9/1987 | Tanaka ................... 310/355 |
| 5,430,342 A | * | 7/1995 | Watson ............... 310/332 X |
| 5,635,786 A | * | 6/1997 | Fujimoto et al. ... 310/329 X |
| 5,701,049 A | * | 12/1997 | Kanayama et al. ... 310/351 X |
| 5,765,046 A | * | 6/1998 | Watanabe et al. ... 310/348 X |
| 6,013,971 A | * | 1/2000 | Fujimoto ............... 310/332 |
| 6,054,798 A | * | 4/2000 | Sato et al. ........... 310/352 X |
| 6,087,763 A | * | 7/2000 | Kim et al. ............. 310/348 |
| 6,288,478 B1 | * | 9/2001 | Ishitoko et al. ...... 310/352 |
| 6,333,589 B1 | * | 12/2001 | Inoi et al. ............ 310/351 X |

FOREIGN PATENT DOCUMENTS

| | | | |
|---|---|---|---|
| EP | 0685704 | 12/1995 | |
| JP | 49-130746 | 8/1973 | |
| JP | 5242088 | 7/1975 | ........ 310/351 |
| JP | 5-034162 A | 2/1993 | |
| JP | 6-058761 A | 3/1994 | |
| JP | 6-174474 A | 6/1994 | |
| JP | 7-131280 A | 5/1995 | |
| JP | 7-332988 A | 12/1995 | |
| JP | 8278145 | 10/1996 | |

OTHER PUBLICATIONS

Kenzo Nagai et al.; "Electrical and Mechanical Vibrator as an Electronic Circuit Element and its Application"; pp. 6–9; Corona Co.; Issued on Mar. 30, 1974.

Patent Abstracts of Japan, vol. 018, No. 293 (P–1747), Jun. 3, 1994 & JP 06 058761 A (AKAI Electric Co., Ltd.).

* cited by examiner

*Primary Examiner*—Mark Budd
(74) *Attorney, Agent, or Firm*—Keating & Bennett, LLP

(57) ABSTRACT

A vibrating gyroscope includes a vibrator having a node and a support member having a thin flexible portion and an expanded portion which is connected to the thin flexibly portion and has a larger area than the thin flexible portion. The expanded portion of the support member is fixed to the vibrator at the node.

20 Claims, 7 Drawing Sheets

VIBRATING GYROSCOPE

This is a continuation of application Ser. No. 09/086,025 filed May 28, 1998, now U.S. Pat. No. 6,288,478.

BACKGROUND OF THE INVENTION

1. Field of the Invention

The present invention relates to a vibrating gyroscope, and more particularly to a vibrating gyroscope used in a video camera or the like to detect external vibrations such as hand shaking by detecting a rotational angular velocity and cancel out the vibrations on the basis of the detected information.

2. Description of the Related Art

One type of vibrating gyroscope is disclosed in Japanese Laid-open Patent Publication No. 8-278145, which is described below with reference to FIG. 1. As shown in FIG. 1, the vibrating gyroscope 1 comprises a vibrator 2 made of a rectangular shaped piezoelectric ceramic material, and two support members 3 having a circular columnar shape and being made of silicone-based resin material.

The vibrator 2 is fixed to a substrate 4 via the support members 3 in such a manner that one end face of each support member 3 is connected to a respective one of two nodes N which occur when the vibrator 2 vibrates and the other end face of each support member 2 is connected to the base plate 4.

Japanese Laid-open Patent Publication No. 8-278145 further discloses that the support members 3 are also formed into a rectangular shape instead of the circular columnar shape.

The vibrating gyroscope according to the conventional technique has the following problems.

In the conventional vibrating gyroscope in which the vibrator is supported on the support members in the form of columns, the diameter of the columns should be large enough to stably support the vibrator. However, the large diameter of the columns can cause the vibration of the vibrator to leak to the substrate through the support members. As a result, a reduction occurs in the amplitude of the vibration of the vibrator. The magnitude of a signal detected by the vibrating gyroscope varies in proportion to the amplitude of the vibrator, and thus the magnitude of the detected signal decreases with the reduction in the amplitude of the vibration of the vibrator. Therefore, the vibrating gyroscope of such a type has a rather low sensitivity.

It is therefore an object of the present invention to solve the above problems. More specifically, it is an object of the present invention to provide a vibrating gyroscope in which a vibrator is supported in a stable fashion without causing a significant reduction in the sensitivity thereby achieving a high sensitivity.

SUMMARY OF THE INVENTION

According to a preferred embodiment of the present invention, a vibrating gyroscope comprises a vibrator having at least one node, and a support member having a thin flexible portion and an expanded portion which is connected the thin flexible portion and has a larger area than the thin flexible portion. The expanded portion of the support member is fixed to the vibrator at the at least one node.

The expanded portion may have a through-hole therein.

According to another embodiment of the present invention, a vibrating gyroscope comprises a vibrator having at least a first node, and first and second support members supporting the vibrator such that the first and second support members sandwich the at least first node of the vibrator.

The vibrator in either embodiment may comprise first and second piezoelectric substrates stacked with each other and being polarized in opposite directions of their thickness directions; first and second split electrodes formed on a principal surface of the first piezoelectric substrate; and a common electrode formed on a principal surface of the second piezoelectric substrate.

The vibrating gyroscope may further comprise third and fourth support members, and the vibrator may have a second node. The third and fourth support members support the vibrator such that the third and fourth support members sandwich the second node of the vibrator. Each of the first, second third and fourth support members may have a thin flexible portion and an expanded portion which is connected to the thin flexible portion and has a larger area than the thin flexible portion, and each of the first, second third and fourth support members may be fixed to the vibrator at the expanded portion thereof.

One of the first and second support members may be electrically connected to the first split electrode and one of the third and fourth support members may be electrically connected to the second split electrode.

According to the vibrating gyroscope of the preferred embodiment of the invention, the contact area between the vibrator and the support members is large enough so that the vibrator is firmly supported by the support members thus achieving high resistance to shock. Other than the connecting portion, the support member is thin and flexible so that the support member has little influence on the vibration of the vibrator, thus not preventing the free vibration of the vibrator and thereby ensuring that the vibrator vibrates with a large enough amplitude to provide a large output signal so that the vibrating gyroscope has a high sensitivity.

Further, the vibrator is supported by being vertically clamped in a sandwich fashion by support members; hence, a problem in which the portions where the vibrator and the support members are bonded are damaged when the vibrator oscillates and the vibrator eventually detaches and falls will not arise, enabling the support structure to provide improved impact resistance and stable joint states.

Moreover, since the support members hold the vibrator therebetween, the support members are not particularly required to have any substantial height, so that the support structure may be made shorter, permitting the entire apparatus to be made shorter accordingly.

For the purpose of illustrating the invention, there is shown in the drawings several forms which are presently preferred, it being understood, however, that the invention is not limited to the precise arrangements and instrumentalities shown.

DETAILED DESCRIPTION OF PREFERRED EMBODIMENTS

Hereinafter, the preferred embodiments of the present invention are explained in detail with reference to the drawings.

First Embodiment

Figure 2:
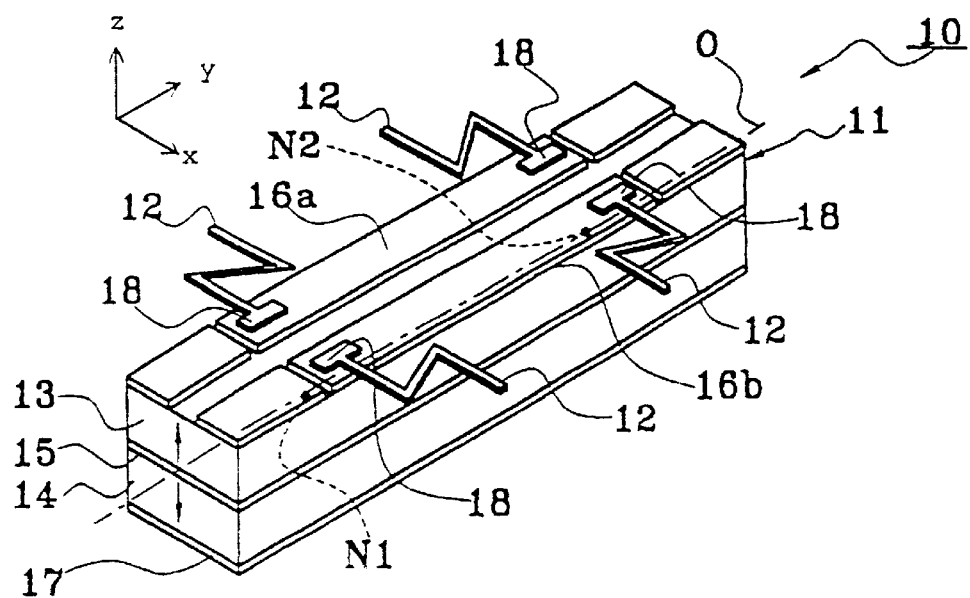
FIG. 2 is a perspective view showing a structure of a vibrating gyroscope according to a first embodiment of the present invention.

FIG. 2 illustrates a first embodiment of a vibrating gyroscope according to the present invention. As shown in FIG. 2, a vibrating gyroscope 10 comprises a vibrator 11 having a substantially rectangular prism shape and four support members 12. The support members 12 support the vibrator 11 at positions corresponding to the two vibration nodes N1 and N2 which appear when the vibrator 11 vibrates.

The vibrator 11 comprises a first piezoelectric substrate 13, a second piezoelectric substrate 14 and an electrode layer 15, the first piezoelectric substrate 13 and the second piezoelectric substrate 14 sandwiching the electrode layer 15. The first and second piezoelectric substrates 13 and 14 are polarized in opposite directions along the direction of their thickness as represented by arrows in FIG. 2. It is noted that the piezoelectric substrates 13 and 14 may be polarized in the same direction in the case where the vibrating gyroscope is operated with the electrode layer grounded.

On the principal surface of the first piezoelectric substrate 13, that is, the surface of the first piezoelectric substrate 13 opposite to the surface in contact with the electrode layer 15, there are split electrodes 16a and 16b spaced from each other in a direction perpendicular to the longitudinal direction. The split electrodes 16a and 16b are each also divided along the longitudinal direction of the vibrator 11 at positions shifted outward from the vibration nodes N1 and N2 of the vibrator 11 toward the ends in the longitudinal direction of the vibrator 11, thereby dividing the split electrodes 16a and 16b into a pair of outer divided electrodes and a central divided electrode, respectively. There is provided a common electrode 17 on the principal surface of the second piezoelectric substrate 14, that is, the surface of the second piezoelectric substrate 14 opposite to the surface in contact with the electrode layer 15.

Each of the four support members 12 is made of a thin metal plate and has a thin flexible portion in a wire form and an expanded portion having a larger area than the thin flexible portion. More specifically, each support member 12 has a Z shaped bent portion as a thin flexible portion and an expanded portion 18 at one end of the Z-shaped bent portion. The Z shaped bent portion is a thin plate having a narrow width. The expanded portion 18 extends in the direction perpendicular to the direction in which the bent portion extends so as to have a larger area than that of the bent portion. FIG. 2 shows that the expanded portion 18 has a rectangular shape. The expanded portions 18 of the four support members 12 are fixed to the central divided electrodes of the split electrode 16a and 16b by means of soldering or the like so that one end of each support member 12 extends in the direction perpendicular to the longitudinal direction of the vibrator 11 and that the connection positions correspond to the two vibration nodes N1 and N2, respectively, which appear when the vibrator 11 vibrates.

Figure 3:
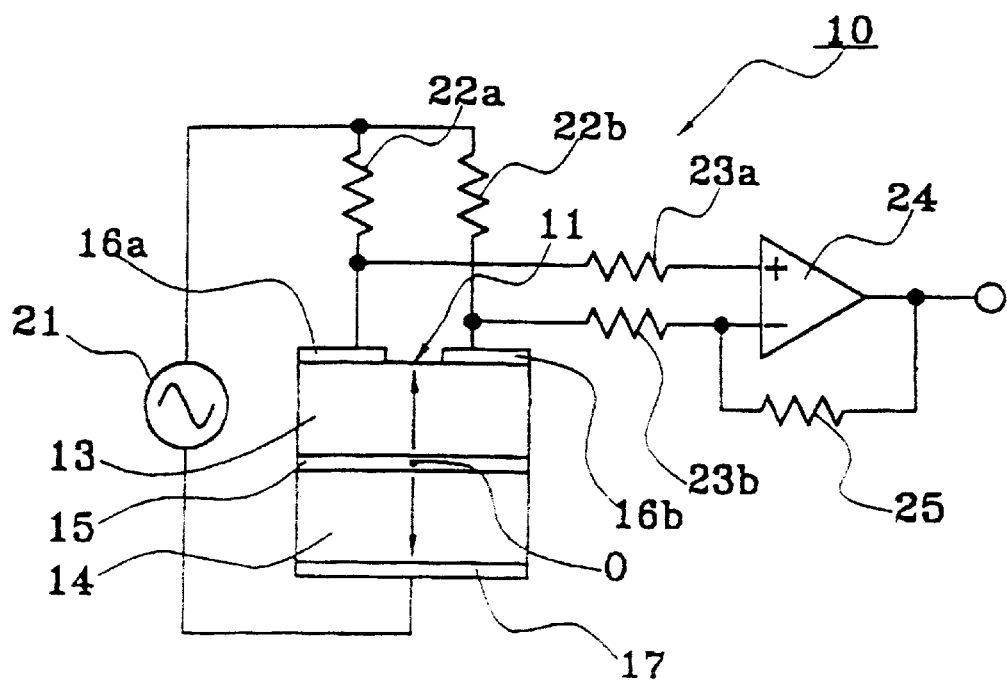
FIG. 3 is a schematic circuit diagram for operating the vibrating gyroscope shown in FIG. 2.

FIG. 3 illustrates an electric circuit connected to the vibrating gyroscope 10. The split electrodes 16a and 16b are connected, via resistors 22a and 22b, respectively, to one output terminal of an oscillator 21 serving as driver means. The common electrode 17 is connected to the other terminal of the oscillator 21. The split electrodes 16a and 16b are also connected, via resistors 23a and 23b, respectively, to a noninverting input terminal (+) and an inverting terminal (−) of a differential amplifier 25 serving as detector means. The output of the differential amplifier 24 is connected, via a resistor 25, to the inverting input (−) of the differential amplifier 24.

In the case where a driving signal in the form of, for example, a sine wave generated by the oscillator 21 is applied via the resistors 22a and 22b to the split electrodes 16a and 16b of the vibrator 11, the first piezoelectric substrate 13 and the second piezoelectric substrate 14 vibrate in a direction perpendicular to the principal surfaces of the respective piezoelectric substrates under a bending mode. When the vibrating gyroscope 10 rotates about the center line O of the vibrator 11, a Coriolis force is generated depending on the rotational angular velocity, wherein the Coriolis force is generated in a direction parallel to the principal surface of the first and second piezoelectric substrates 13 and 14 and perpendicular to the center axis O of the vibrator 11. The Coriolis force causes a change in the direction of the bending vibration of the vibrator 11, which results in generation of a signal between the split electrodes 16a and 16b depending on the rotational angular velocity. The signal generated between the split electrodes 16a and 16b is detected via the resistors 23a and 23b by the differential amplifier 24. Thus the angular velocity of the rotation can be detected from the output signal of the differential amplifier 24.

In the vibrating gyroscope 10, the contact area between the vibrator 11 and the support members 12 is large enough so that the vibrator 11 is firmly supported by the support members 12, thus achieving high resistance to shock. Other than the expanded portion 18, each support member 12 is formed into a thin plate shape so that no vibration is substantially transmitted from the vibrator 11 to the outside of the vibrator 11 through the support members 12, and thus no vibration damping occurs, thereby ensuring that the vibrator 11 vibrates with a large enough amplitude so that the vibrating gyroscope 10 has a high sensitivity.

In addition, since each support member has a Z-shape bent portion, it is possible for the support member 12 to absorb the impact applied to the vibrator 11 along either x, y or z axis.

Second Embodiment

Figure 4:
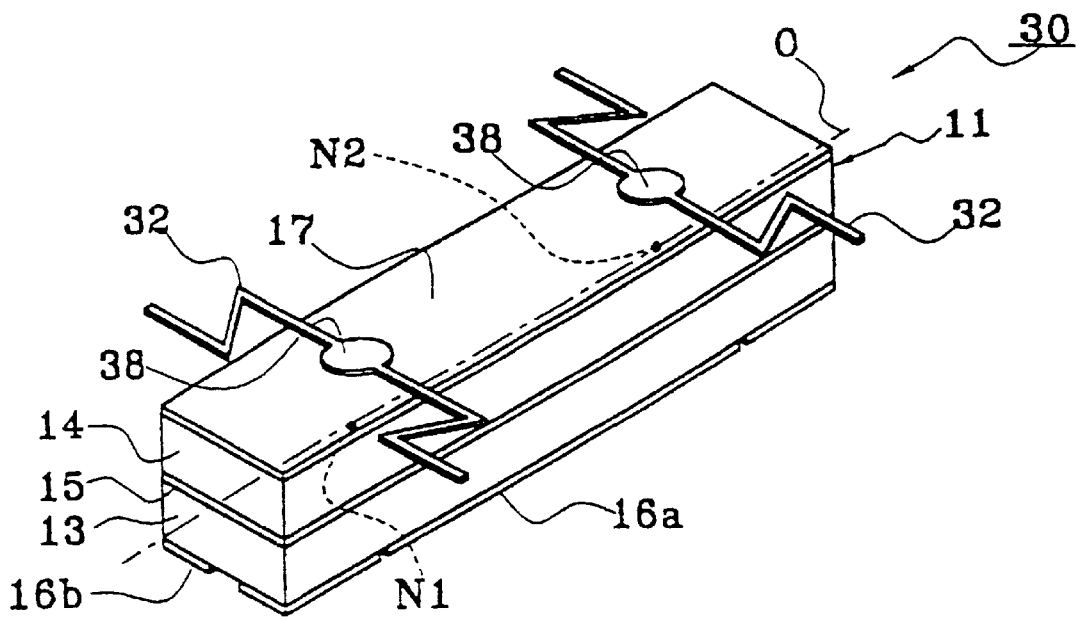
FIG. 4 is perspective view showing a structure of a vibrating gyroscope according to a second embodiment of the present invention.

FIG. 4 illustrates a second embodiment of a vibrating gyroscope according to the present invention. In the vibrating gyroscope 30, a vibrator 11 is supported by two support members 32 which are connected to the common electrode 17 at two vibration nodes N1 and N2 and which extend from the vibrator 11 in directions perpendicular to the longitudinal direction thereof.

Each support member 32 has a pair of Z-shaped bent portions as a thin flexible portion and an expanded portion 38 in a substantially circular shape. The pair of Z-shaped bent portions are symmetrically connected to the expanded portion 38 so as to extend in the opposite directions. The expanded portions 38 of the support members 32 are respectively fixed at the nodes N1 and N2 so that each support member 32 has a larger contact area at the expanded portion 38 and that both ends of each support member 32 extend in a direction perpendicular to the longitudinal direction of the vibrator 11. The other parts of the vibrating gyroscope 30 are similar to those of the vibrating gyroscope 10 and denoted with the same reference numerals. Also, the vibrating gyroscope 30 is operated using the circuit shown in FIG. 2.

In this vibrating gyroscope 30, the vibrator is supported by only two support members in a simpler fashion than the first embodiment of the vibrating gyroscope.

Figure 5:
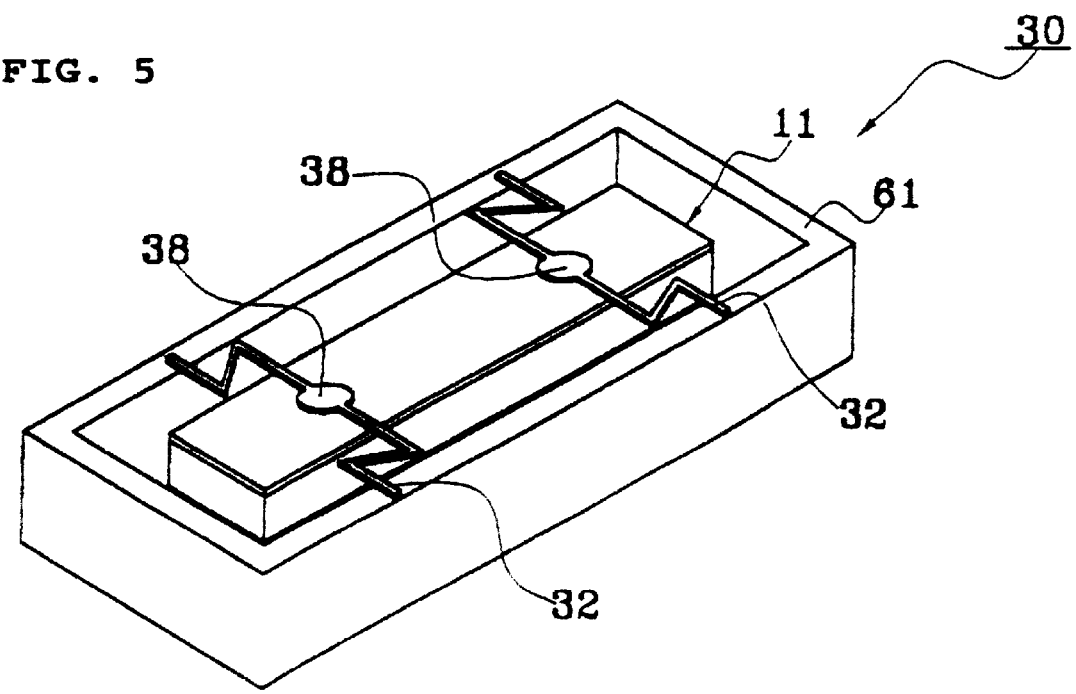
FIG. 5 is a perspective view showing the vibrating gyroscope of FIG. 4 mounted in a frame.

The vibrating gyroscope 30 can be successfully mounted to a frame shaped support. As shown in FIG. 5, the vibrator 11 is placed in a metal frame 61 in such a manner that the vibrator 11 is suspended from the support members 32. The support members 32 are firmly connected to the upper end face of the frame 61 by means of soldering or the like so that the vibrator 11 is suspended in the hollow space within the frame and so that the plane of the common electrode 17 of the vibrator 11 is flush with the upper end face of the frame 61.

By employing the above technique of mounting the vibrating gyroscope, it becomes possible to realize a vibrating gyroscope having a small total height. The reduction in the total height brings about an increase in the flexibility in the design of the vibrating gyroscope. Because the plane of the common electrode 17 of the vibrator 11 is flush with the upper end face of the frame 61, it is possible to simultaneously solder a plurality of connections. This allows the assembling process to be performed in a highly efficient fashion using an automated assembling machine having a simple structure.

In the first and second embodiment, although each support member is formed into a Z-shape, the shape of the support members is not limited to an acute-angled shape such as a Z-shape, but may also have a curved shape. Furthermore, the support members may be formed either in a bent shape or in a non-bent shape. However, a bent shape brings about the advantage that the vibrator can be elastically supported so that when the vibrator vibrates, the support members are deformed at the bent portions of the support members thereby suppressing the vibration damping.

Furthermore, although metal is employed as the material of the support members in the above embodiments, the material is not limited to metal. However, the employment of metal having the elastic property enables the support members to be easily bent to suppress vibration damping. Furthermore, when the support members are made of metal, the support members may also be used as lead wires. In this case, no additional lead wires are necessary, and thus the production process becomes simpler and the elimination of the additional lead wires extending through the hollow space make the structure of the vibrating gyroscope simpler.

Furthermore, the shape of the expanded portions of the support members is not limited to either a circular shape or a rectangular shape, but an arbitrary shape may be employed depending on the particular application in which the vibrating gyroscope is used or depending on the shape of the vibrator.

Although in the above embodiments the vibrator comprises two piezoelectric substrates, there is no particular limitation in terms of the structure of the vibrator, and the present invention may also be applied to a vibrator made of metal pieces in the form of a triangular or rectangular prism.

Figure 6:
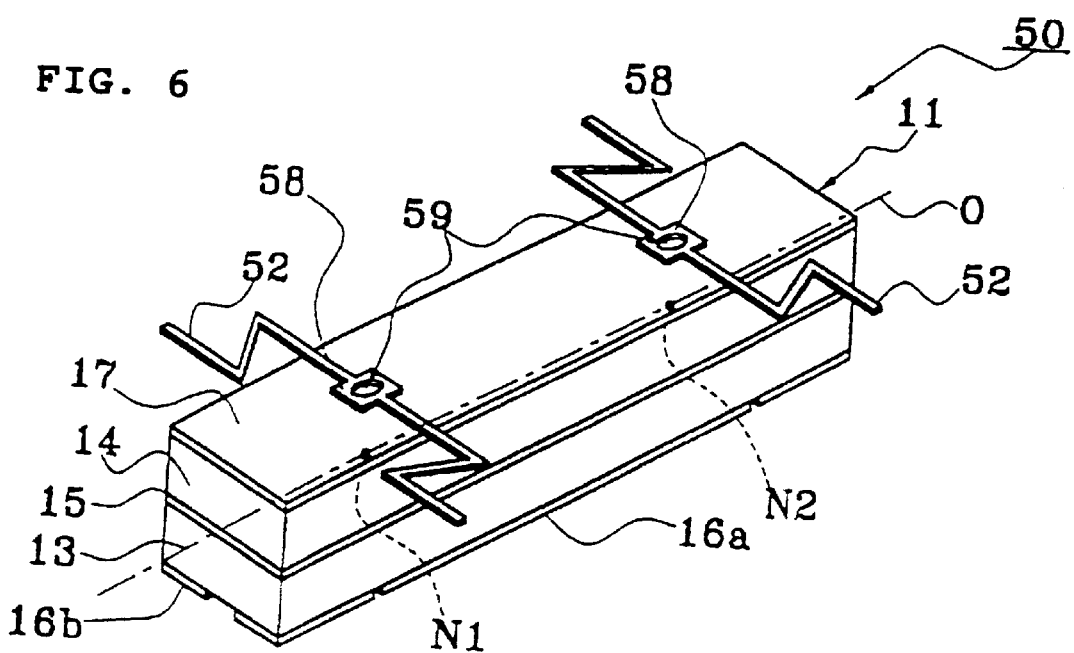
FIG. 6 is a perspective view showing a structure of a vibrating gyroscope according to a variation of the second embodiment of the present invention.

FIG. 6 illustrates a variation of the second embodiment of a vibrating gyroscope according to the present invention. In this vibrating gyroscope 50, two support members 52 are connected to the common electrode 17 of the vibrator 11 in such a manner that the connection positions correspond to two vibration nodes N1 and N2. Each of the support member 52 has the same shape as that of the support member 32 shown in FIG. 4 except that an expanded portion 58 has a through-hole 59 formed in its central position. The other parts of the vibrating gyroscope 50 are similar to those of the vibrating gyroscope 30 and denoted by similar reference numerals.

In this vibrating gyroscope 50 having the above-described structure, when the support members 52 are connected to the vibrator 11 via solder, solder may be placed in the through-hole 59 of each support member 52. This allows the amount of solder connecting the vibrator 11 to the support members 52 to be controlled more easily at a desired fixed value without producing an excess or lack of solder than the vibrating gyroscope according to the embodiments of FIG. 2 or FIG. 5. Furthermore, the soldering position can be precisely controlled because the soldering position is determined by the position of the through-hole 59 which can be precisely formed at a fixed position. Thus it is possible to realize a vibrating gyroscope having a supporting mechanism capable of providing a high reliability connection.

Third Embodiment

Figure 7:
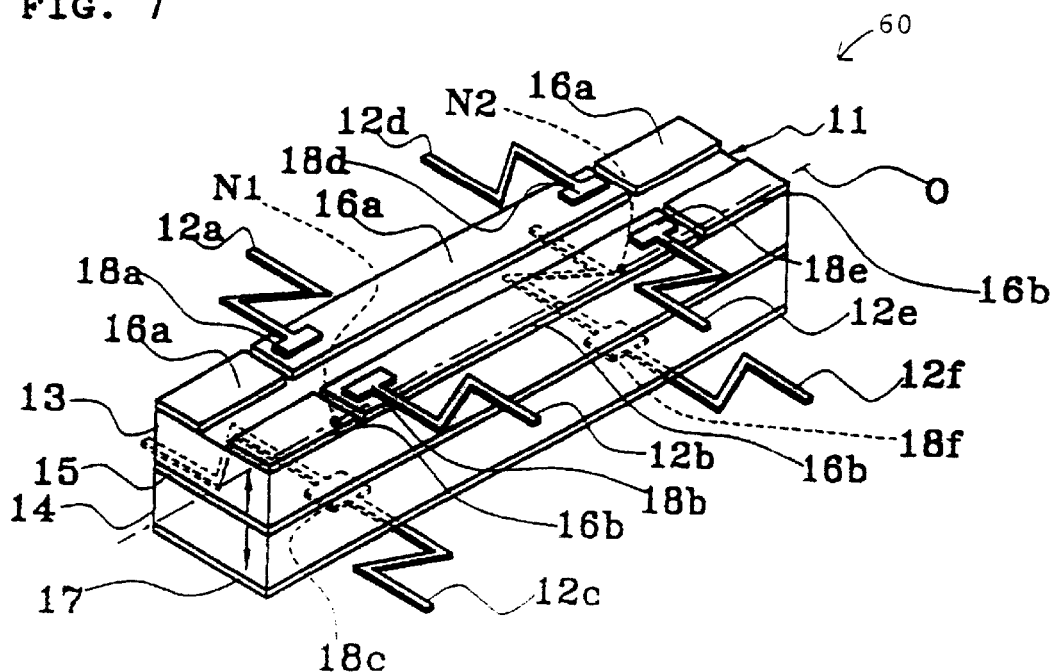
FIG. 7 is a perspective view showing a structure of a vibrating gyroscope according to a third embodiment of the present invention.

FIG. 7 illustrates a third embodiment of a vibrating gyroscope according to the present invention. A vibrating gyroscope 60 comprises a rectangular prism shaped vibrator 11 and support members 12a, 12b, 12c, 12d, 12e, and 12f which support the vibrator 11 such that the support members 12a, 12b, 12c, 12c, 12d, 12e, and 12f clamp the vibrator 11 at the points corresponding to two nodes N1 and N2. The vibrator 11 has the same structure as that explained in detail with reference to FIG. 2.

Figure 1:
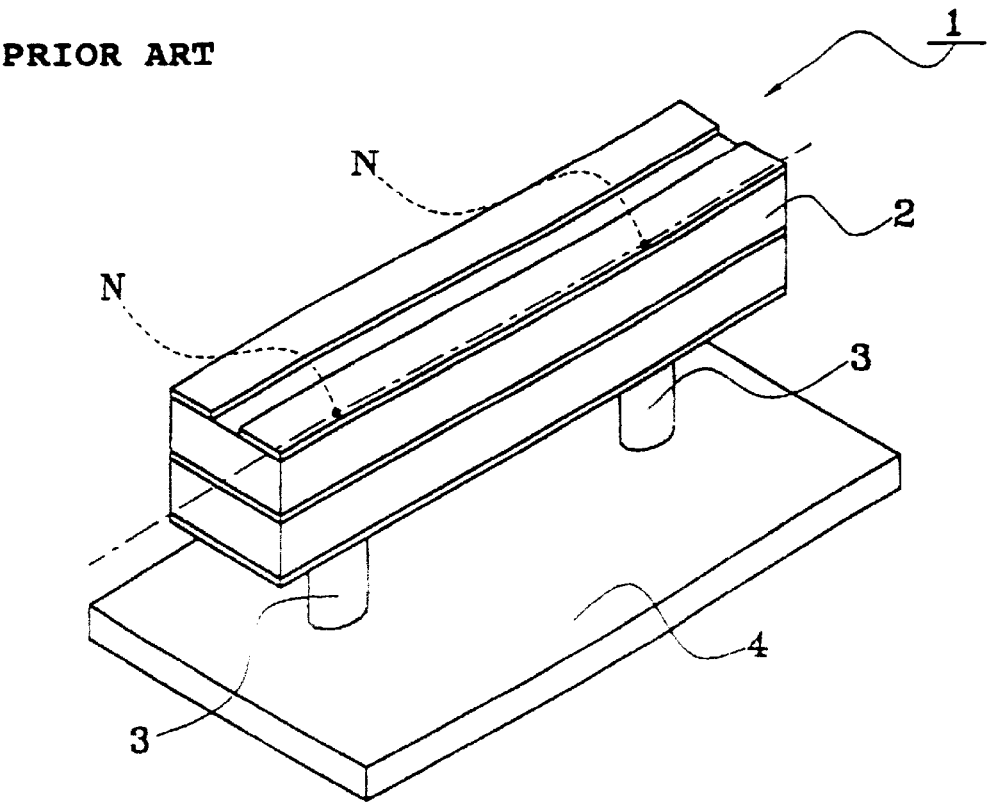
FIG. 1 is a perspective view showing a structure of a conventional vibrating gyroscope.

The support members 12a, 12b, 12d, and 12e include respective Z-shaped bent portions and respective expanded portions 18a, 18b, 18d, and 18e and have the same structure as that of the support members 12 (FIG. 1) explained in the first embodiment. On the other hand, the support members 12c and 12f include a pair of Z-shaped bent portions and expanded portions 18c and 18f and have the same structure as that of the support members 32 (FIG. 4) explained in the second embodiment.

The support members 12a and 12b are secured, via the expanded portions 18a and 18b, by soldering or the like to the segmental electrodes 16a and 16b located on the top of the vibrator 11 at the node N1. The support member 12c is secured, via the expanded portion 18c, by soldering or the like to the common electrode 17 located on the bottom of the vibrator 11 at the node N1. Likewise, the support members 12d and 12e are secured, via the expanded portions 18d and 18e to the segmental electrodes 16a and 16b located at the node N2. The support member 12f is secured, via the expanded portion 18f, to the common electrode 17 located at the node N2.

Thus, the vibrator 11 is supported and secured by being sandwiched vertically at the nodes N1 by support members 12a, 12b and 12c and at the nodes N2 by support members 12d, 12e and 12f.

In the vibrating gyroscope 60, since the vibrator 11 is supported by being sandwiched the possibility of the vibrator 11 detaching from its supports is reduced and, thus, the vibrating gyroscope employing the support structure of this embodiment provides improved resistance to impact and higher reliability.

Figure 8:
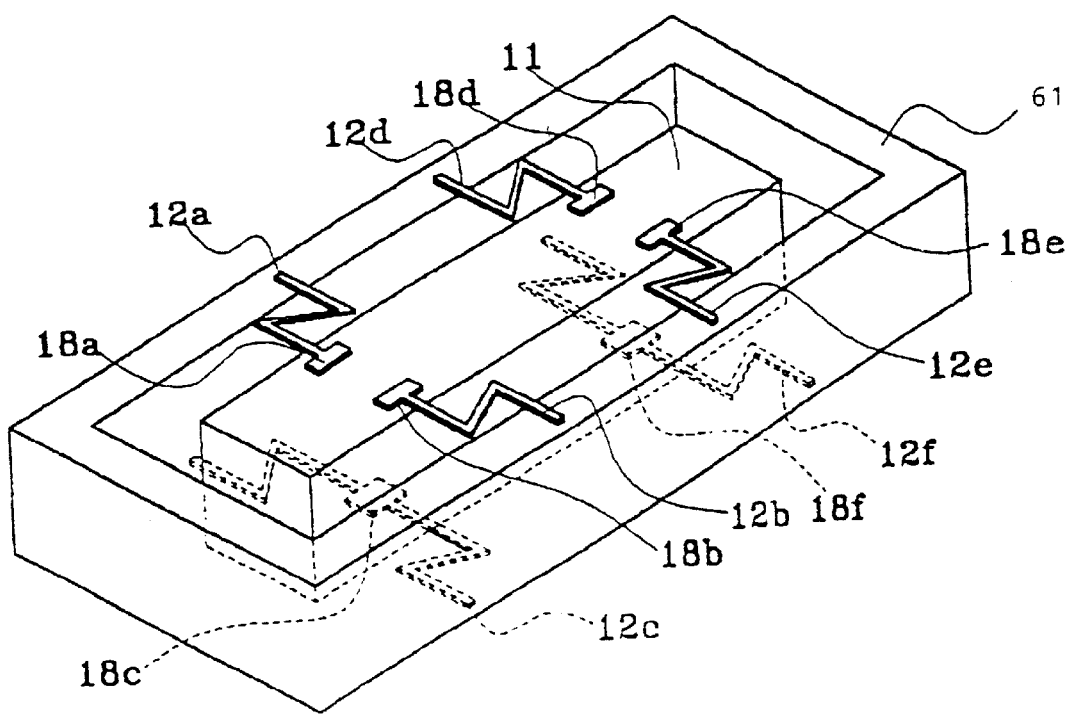
FIG. 8 is a perspective view showing the vibrating gyroscope of FIG. 7 mounted in a frame.

FIG. 8 shows a vibrating gyroscope 60 mounted at a frame 61. For the purpose of clarity of illustration, the vibrator 11 is shown in simplified shape.

The vibrator 11 is suspended by the support members 12a through 12f and put in a frame 61 made of metal or the like. The top surface of the frame 61 and the support members 12a, 12b, 12d, and 12f are bonded and secured by soldering or the like. In the same manner, the bottom surface of the frame 61 and the support members 12c and 12f are fixed. Thus, the vibrator 11 is supported and fixed in the hollow space defined by the frame 61. At this time, the top surface of the vibrator 11 is flush with the top surface of the frame 61. Likewise, the bottom surface of the vibrator 11 is flush with the bottom surface of the frame 61.

The vibrating gyroscope installed as described above permits a reduced height of the entire vibrating gyroscope, so that a shorter vibrating gyroscope can be accomplished, and the reduced height also leads to greater freedom of design. In addition, since the top surface of the vibrator and the top surface of the frame are flush and the bottom surface of the vibrator and the bottom surface of the frame are also flush, solder can be attached to a plurality of spots on the same plane in the soldering process. This permits greater ease of work and, accordingly, allows an automated machine of a simpler structure to be introduced in the assembly process.

Figure 9:
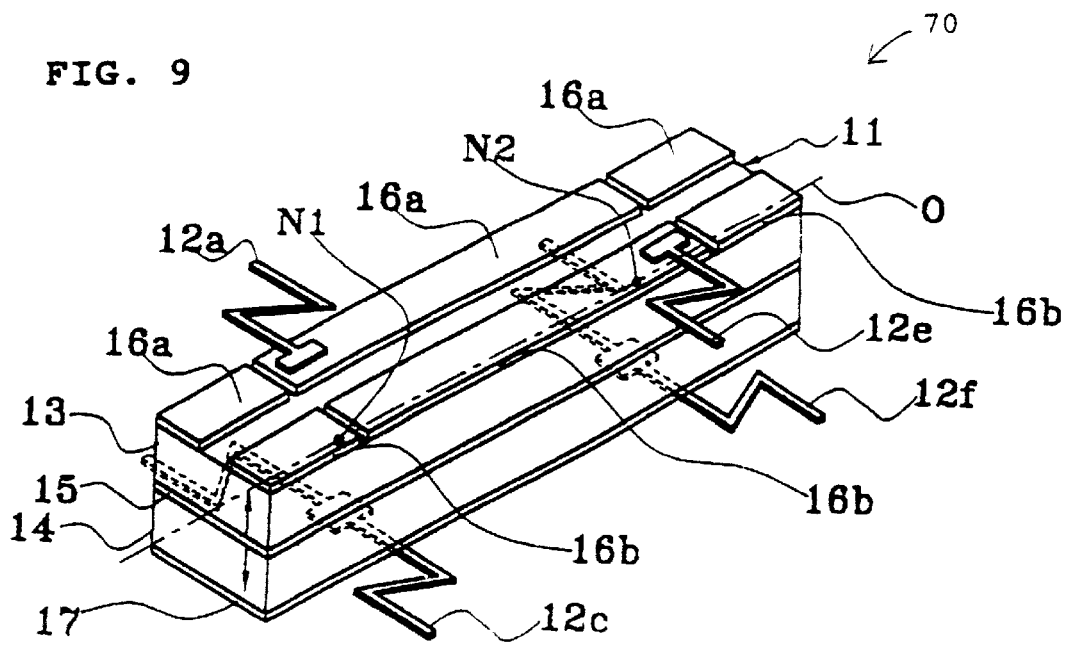
FIG. 9 is a perspective view showing a structure of a vibrating gyroscope according to a variation of the third embodiment of the present invention.

FIG. 9 shows a variation of the vibrating gyroscope according to the third embodiment of the present invention.

A vibrating gyroscope 70 shown in FIG. 9 is different from the vibrating gyroscope 60 shown in FIG. 7 in that the support member 12b and the support member 12d are not mounted; in other words, there are only four support members 12a, 12c, 12e, and 12f. The rest of the configuration is the same as that of the first embodiment; hence, like reference numerals will be used and the description thereof will be omitted.

The vibrator support structure configured as described above has fewer support members, so that the configuration thereof is simplified. Moreover, since the number of contact points between the vibrator and the support members is reduced, the vibration of the vibrator is not restrained and, accordingly, becomes closer to free oscillation. Although the resistance to impact is lower than that of the vibrating gyroscope 60, it is sufficiently high for practical use owing to the simpler sandwich structure.

Figure 10:
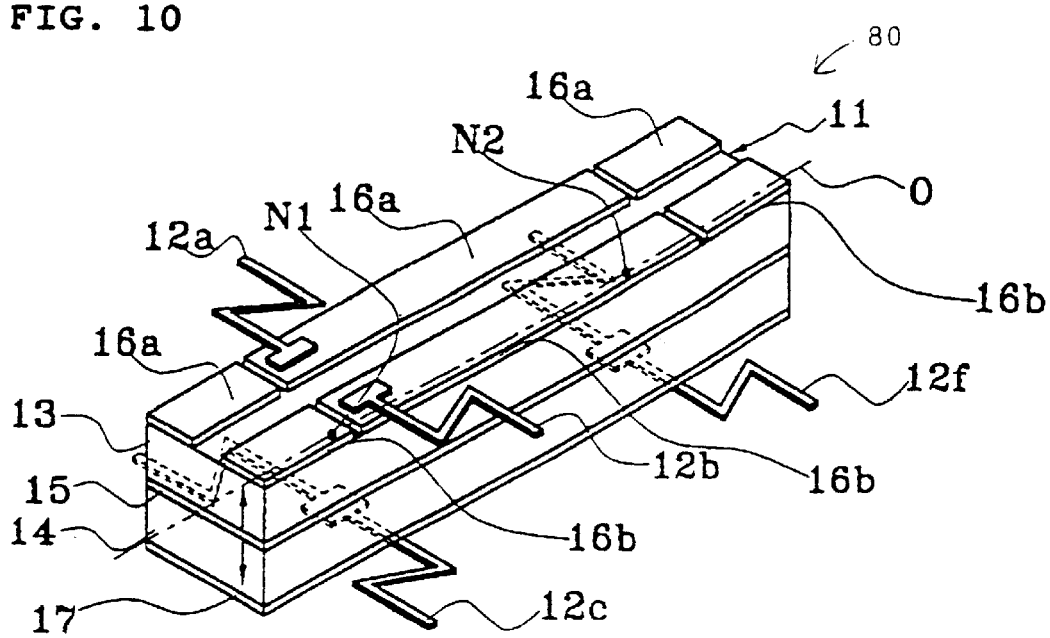
FIG. 10 is a perspective view showing a structure of a vibrating gyroscope according to another variation of the third embodiment of the present invention.

FIG. 10 shows another variation of the vibrating gyroscope according to the third embodiment of the present invention.

A vibrating gyroscope 80 is different from the vibrating gyroscope 60 shown in FIG. 7 in that the support member 12d and the support member 12e are not mounted; in other words, there are only four support members 12a, 12b, 12c, and 12f. The rest of the configuration is the same as that of the first embodiment; hence, like reference numerals will be used and the description thereof will be omitted.

The vibrator support structure configured as described above has fewer support members, so that the configuration thereof is simplified. Moreover, since the number of contact points between the vibrator and the support members is reduced, the oscillation of the vibrator is not restrained and, accordingly, becomes closer to free oscillation. Although the resistance to impact is lower than that of the vibrating gyroscope 60, it is sufficiently high for practical use owing to the sandwich structure in one place at the node N1.

In this embodiment, the support members 12a through 12f have the expanded portions 18a through 18f at the sections where the vibrator 11 is joined to the support members 12a through 12f. However, the present invention is not particularly limited to the structure where the areas of the joint portions of the support members are increased. Nevertheless, providing the expanded portion at the support members to increase the joint areas adds to the force of the joint between the support members 12a through 12f and the vibrator 11, thus enabling sufficient resistance to impact to be obtained. The support members 12 are shaped like thin lines other than the portions joined to the vibrator 11 in order to minimize the chance of the occurrence of a vibrating damping problem caused by the leakage of the vibration of the vibrator 11 through support members 12a through 12f to the outside of the vibrator 11. Hence, the vibrating gyroscope has improved impact resistance and permits a sufficiently large vibration amplitude, so that the vibrating gyroscope provides better detection sensitivity.

Further, in this embodiment, the support members have the bent portions formed in a Z-shape. The support members, however, are not particularly limited to have shapes with sharp bends like Z shapes; they may alternatively be shaped to have curves. Further alternatively, the support members are not particularly required to have bends. Providing the bends, however, makes it possible to resiliently support the vibrator; when the vibrator oscillates, the support members deform at the curves so as to control the damping of the oscillation.

In addition, although the support members use metal as the material thereof in this embodiment, the material is not particularly limited to metal. The use of a resilient metal for the support members enables the support members to easily bend, so that the damping of vibration can be further restrained. Moreover, constructing the support members of metal allows the support members to serve also as lead wires, obviating the need for providing lead wires separately. This leads to a simplified process and also a simplified structure since there is no wiring structure of lead wires.

The invention has been described using a vibrator composed of two piezoelectric substrates. However, the invention is not particularly limited thereto, and the invention may be applied also to vibrators composed of triangular- or square-prism metal vibrating reeds.

Fourth Embodiment

Figure 11:
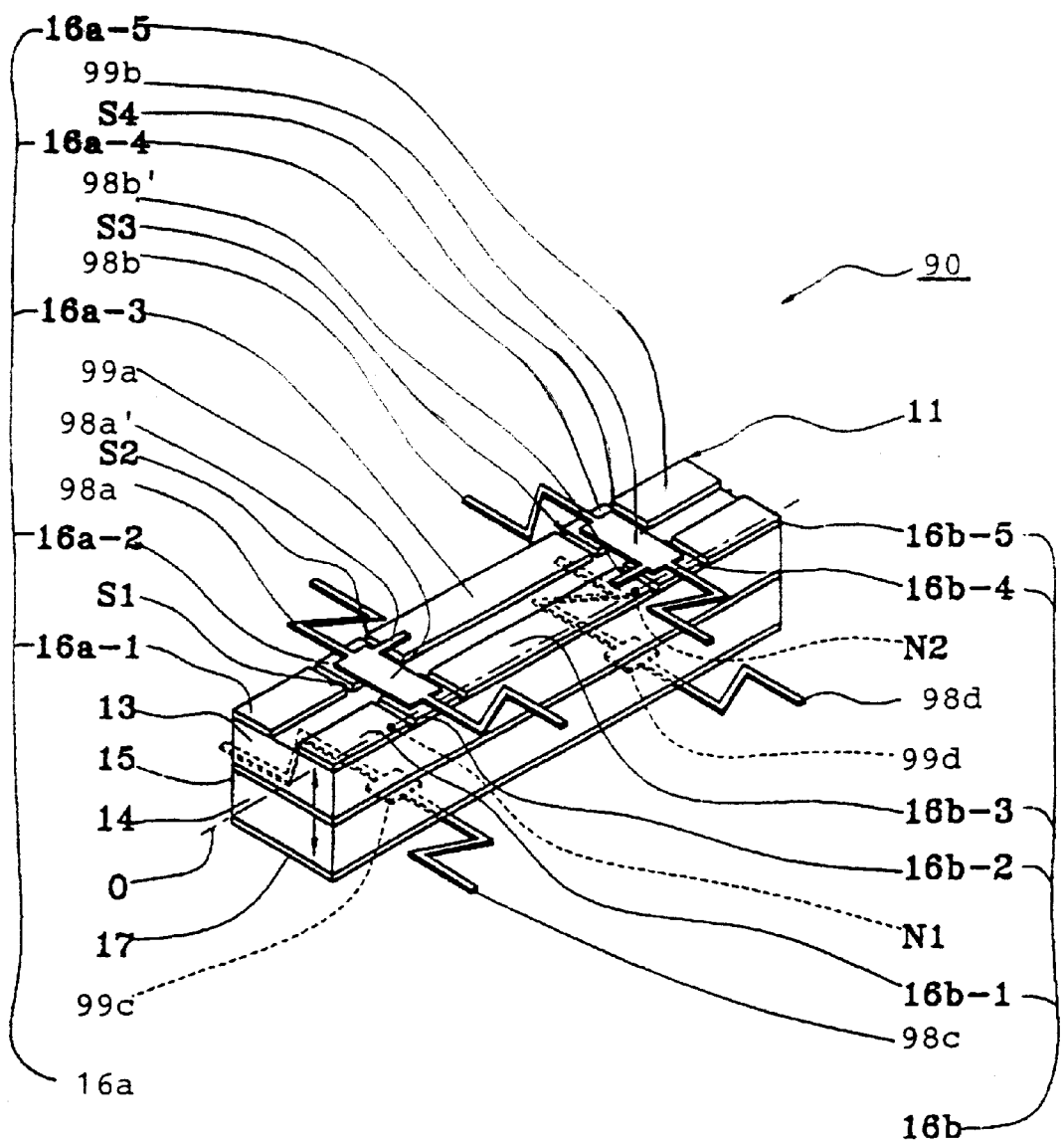
FIG. 11 is a perspective view showing a structure of a vibrating gyroscope according to a fourth embodiment of the present invention.

FIG. 11 illustrates a vibrating gyroscope according to a fourth embodiment of the present invention. As shown in FIG. 11, a vibrating gyroscope 90 comprises a vibrator 11 having a substantially rectangular prism shape.

The vibrator 11 comprises a first piezoelectric substrate 13, a second piezoelectric substrate 14 and an electrode layer 15, the first piezoelectric substrate 13 and the second piezoelectric substrate 14 sandwiching the electrode layer 15. The first and second piezoelectric substrates 13 and 14 are polarized in opposite directions along the direction of their thickness as represented by arrows in FIG. 11.

On one principal surface of the first piezoelectric substrate 13, that is, the surface of the first piezoelectric substrate 13 opposite to the surface in contact with the electrode layer 15, there are provided split electrodes 16a and 16b spaced from each other in a direction perpendicular to the longitudinal direction of the first piezoelectric substrate 13 and extending along the longitudinal direction. There is provided a common electrode 17 on one principal surface of the second piezoelectric substrate 14, that is, the surface of the second piezoelectric substrate 14 opposite to the surface in contact with the electrode layer 15.

The split electrodes 16a and 16b have grooves S1, S2, S3 and S4 along the direction perpendicular to the longitudinal direction such that the grooves S1 and S2 and the grooves S3 and S4 interpose the positions corresponding to nodes N1 and N2 of the vibrator 11, respectively. As a result, the split electrode 16a is divided into divided electrodes 16a-1, 16a-2, 16a-3, 16a-4 and 16a-5. In the same manner, the split electrode 16b is divided into divided electrodes 16b-1, 16b-2, 16b-3, 16b-4 and 16b-5.

The vibrating gyroscope 90 further comprises support members 98a, 98b, 98c and 98d. The support members 98a, 98b, 98c and 98d respectively have a pair of Z-shaped bent portions and expanded portions 99a, 99b, 99c and 99d in a rectangular shape. One end of each pair of Z-shaped bent portions is connected to the respective expanded portions 99a, 99b, 99c and 99d, whereby the expanded portions 99a, 99b, 99c and 99d are located at the substantial middle of the support members 98a, 98b, 98c and 98d, respectively. Each support member is made of a permanent elastic metal such as elinvar, and is therefore electroconductive. The expanded portion of each support member is formed for enlarging an area to be fixed to the vibrator 11 in each support member.

The expanded portion 99a of the support member 98a is fixed to the divided electrodes 16a-2 and 16b-2 located at the node N1 through soldering, and the expanded portion 99b of the support member 98b is fixed to the divided electrodes 16a-4 and 16b-4 located at the node N2 through soldering. On the other hand, the expanded portions 99c and 99d of the support members 98c and 98d are fixed to portions of the common electrode 17 at the nodes N1 and N2 through soldering, respectively. It is preferable that the support members 98a and 98b are bent toward each other, and the support members 98c and 98d are bent away from each other as is shown in FIG. 11, or vice versa so that the vibrator 11 can be supported more stably. By this structure, the vibrator 11 is interposed or clamped between the support members 98a and 98c and the support members 98c and 98d and supported by the support members 98a, 98b, 98c and 98d.

In the gyroscope 90, the support member 98a to 98d are made of metal and used as conductive wires to be electrically connected to the divided electrodes 16a-3 and 16b-3 and the common electrode 17. More specifically, the support member 98a is to be used as an input/output terminal for the divided electrode 16a-3, and it is necessary for the support member 98a to be electrically connected only with the divided electrode 16a-3. Thus, the support member 98a is provided with a protrusion 98a' extending from the expanded portion 99a toward the divided electrode 16a-3. The protrusion 98a' is electrically connected to the divided electrode 16a-3 through soldering or the like, whereby the support member 98a functions as a conductive wire for the divided electrode 16a-3.

In the same manner, the support member 98b is to be used as an input/output terminal for the divided electrode 16b-3, and it is necessary for the support member 98b to be electrically connected only with the divided electrode 16b-3. Thus, the support member 98b is provided with a protrusion 98b' extending from the expanded portion 99b toward the divided electrode 16b-3. The protrusion 98b' is electrically connected to the divided electrode 16b-3 through soldering or the like, whereby the support member 98b functions as a conductive wire for the divided electrode 16b-3.

It is noted that the support member 98a is soldered to both the divided electrodes 16a-2 and 16b-2. This means that the support member 98a is electrically connected to both the divided electrodes 16a-2 and 16b-2 and that signals output from both the divided electrodes 16a-2 and 16b-2 are detected though the support member 98a. However, this does not cause any substantial adverse effects on a signal obtained from the divided electrode 16a-3 through the support member 98a, as the signals from the divided electrodes 16a-2 and 16b-2 cancel each other by subtracting the signal from the divided electrodes 16a-2 from the signal from the divided electrodes 16b-2.

In the same way, since the support member 98a is soldered to both the divided electrodes 16a-2 and 16b-2, the support member 98b is electrically connected to both the divided electrodes 16a-4 and 16b-4, and signals output from both the divided electrodes 16a-4 and 16b-4 are detected though the support member 98b. However, this also does not cause an substantial adverse effect on a signal obtained from the divided electrode 16b-3 through the support member 98b, as the signals from the divided electrodes 16a-4 and 16b-4 cancel each other by subtracting the signal from the divided electrodes 16a-4 from the signal from the divided electrodes 16b-4.

Figure 12:
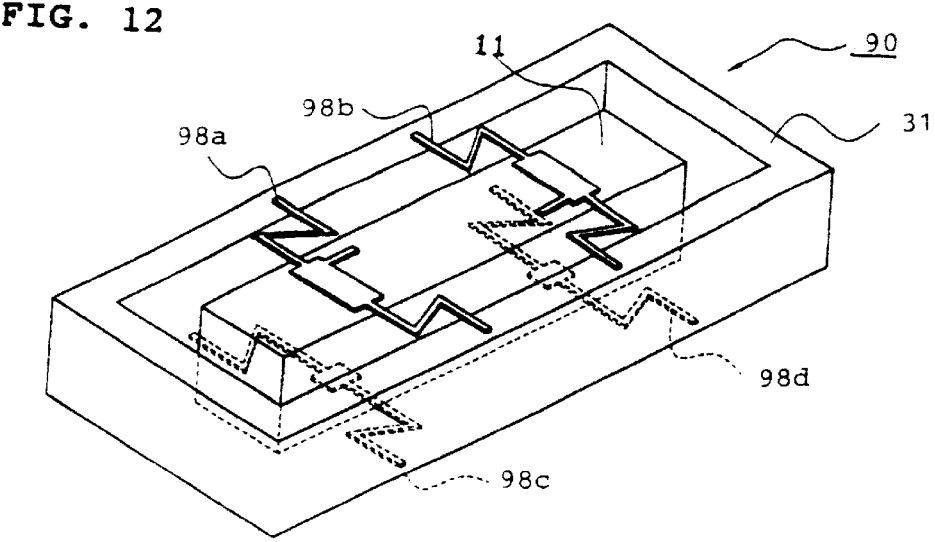
FIG. 12 is a perspective view showing the vibrating gyroscope of FIG. 11 mounted in a frame.

FIG. 12 shows the vibrating gyroscope 90 mounted on a frame 31. Note that the vibrator 11 shown in FIG. 12 is drawn as a rectangular prism with no electrode for clarity. The vibrator 11 is suspended by the support member 98a to 98d and placed in the frame 31 made of metal or the like. The top surface of the frame 31 and the support members 12a, 12b, 12d, and 12f are bonded and secured by soldering or the like. In the same manner, the bottom surface of the frame 31 and the support members 12c and 12f are fixed. Thus, the vibrator 11 is supported and fixed in the hollow.

According to the vibrating gyroscope of the fourth embodiment, contact area between the vibrator 11 and the support members 98a to 98d can be made large due to the expanded portions 99a to 99d. Therefore, the adhesive force between the vibrator 11 and the support member 98a to 98d becomes great, thereby obtaining a sufficient impact resistivity. Moreover, the support members 98a to 98d have a thin wire structure other than the expanded portions 99a to 99d. This prevents the occurrence of damping such as leakage of vibration from the vibrator 11 to the outside via the support members 99a to 99d, thereby increasing the amplitude of vibration of the vibrator 11 and improving the detection sensitivity.

In addition, each of the support member has the expanded portion and the pair of bent portions connected to the expanded portion, and the expanded portion of each support member is fixed at approximately the middle of the vibrator 11 in the transverse direction thereof. Thus, the impact applied to the vibrator 11 is transmitted to both ends of the each support member so that the expanded portion of each support member is not subjected to severe impact or stress due to impact. This successfully prevents each support member from being detached from the divided electrode fixed to each support member.

In addition, the support members 98a and 98b fixed to the surface where the split electrodes 16a and 6b are formed are configured to be electrically connected to the divided electrodes 16a-3 and 16b-3, respectively. Therefore, the support members 98a and 98b firmly support the vibrator 11 while working as lead wires.

Figure 13:
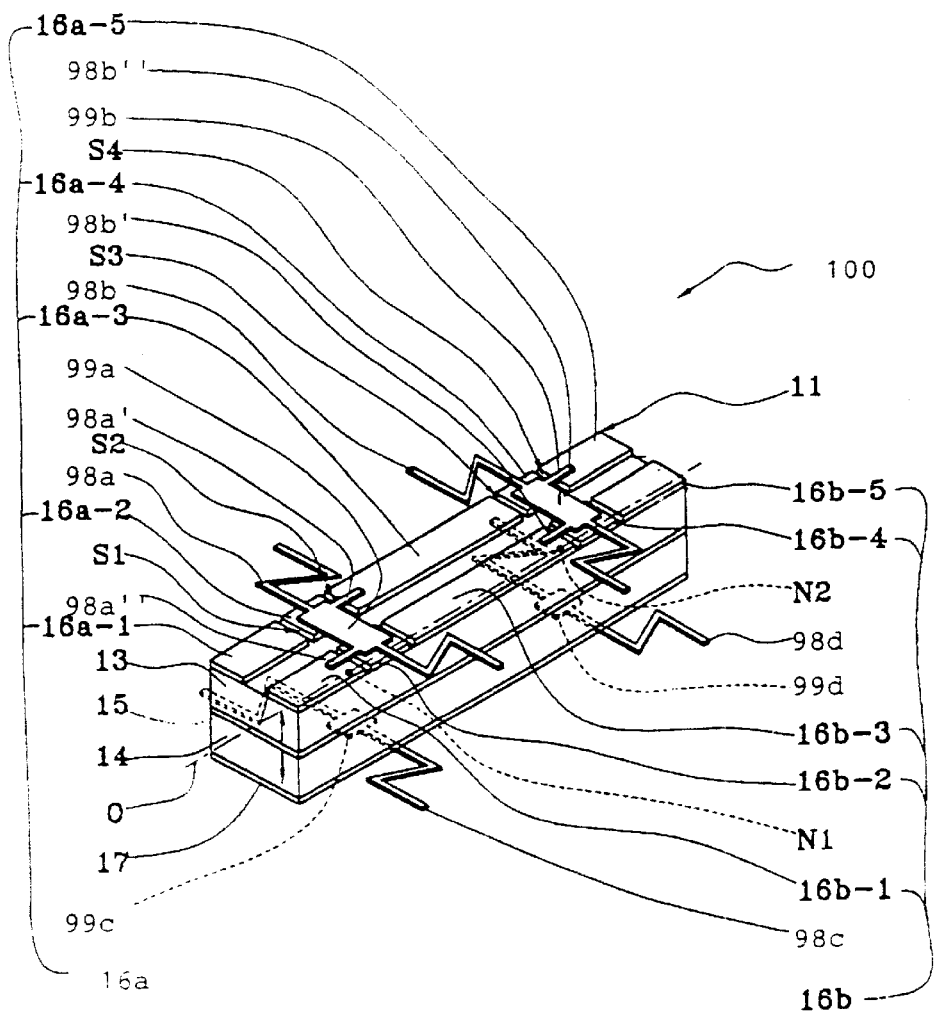
FIG. 13 is a perspective view showing a structure of a vibrating gyroscope according to a variation of the fourth embodiment of the present invention.

FIG. 13 shows a variation of the vibrating gyroscope according to the third embodiment of the present invention.

A vibrating gyroscope 100 shown in FIG. 13 is different from the vibrating gyroscope 90 shown in FIG. 11 in the following features.

The support member 98*a* has another protrusion 98*a"* extending from the expanded portion 99*a* toward the divided electrode 16*b*-1 in the direction opposite to the direction in which the protrusion 98*a*, extends, and the protrusion 98*a"* is electrically connected to the divided electrode 16*b*-1.

The support member 98*b* also has an another protrusion 98*b"* extending from the expanded portion 99*b* toward the divided electrode 16*a*-5 in the direction opposite to the direction in which the protrusion 98*b'* extends, and the protrusion 98*b"* is electrically connected to the divided electrode 16*a*-5.

According to this structure, the divided electrode 16*a*-3 and the divided electrode 16*b*-3 are electrically connected to the divided electrode 16*b*-1 and the divided electrode 16*a*-5, respectively so as to be connected to the divided electrodes located diagonally. Since the signal generated at the divided electrodes 16*a*-1 and 16*b*-1 or at the divided electrodes 16*a*-5 and 16*b*-5 has the opposite polarity to that generated at the divided electrodes 16*a*-3 and 16*b*-3, the signal corresponding to the rotational angular velocity becomes large due to the sum of the signal from divided electrode 16*a*-3 and the signal from the divided electrode 16*b*-1 and the sum of the signal from divided electrode 16*b*-3 and the signal from the divided electrode 16*a*-5, thereby improving the detection efficiency.

In this embodiment, the vibrating gyroscope 90 shown in FIG. 11 comprises the vibrator 11 provided with the grooves S1, S2, S3 and S4 so that the signals generated at the divided electrode 16*a*-1 and 16*b*-1 are not used and that the signals generated at the divided electrodes 16*a*-2 and 16*b*-2 in the vicinity of the nodes N1 and N2 are canceled. Since the signals generated in the vicinity of the nodes N1 and N2 are very weak, this structure reduces the adverse effects due to the compositional and or dimensional variation of the vibrator 11 and provides more accurate detection signals.

In the case where such variations may be negligible, the grooves S1 and S4 may be omitted. In such a case, the signals generated at the outsides of the nodes N1 and N2 are ideally canceled, and do not affect the detection of the signal corresponding to the rotational angular velocity.

In addition, the support member 98*a* to 98*d* may be fixed to the vibrator 11 through a non-electroconductive adhesive. In such a case it is possible to omit the grooves S2 and also possible to omit the grooves S2 and S3. Further, the grooves S1 and S4 can be omitted although the signals output from the split electrode 16*a* and 16*b*are reduced due to the fact that the polarity of the signals are inverted between the outside of the nodes N1 and N2 and the inside of the nodes N1 and N2.

Moreover, the support member 98*a* to 98*d* may have a shape different form that shown in FIG. 11 or FIG. 13. Specifically, expanded portions 99*a* to 99*d* may have a circular shape, a ring shape, or other polygonal shape. The expanded portions 99*a* to 99*d* may be omitted. Further, the bent portion of the support member may have the shape other than a Z-shape. For example, the bent portion of the support member may have an arch shape. Although it is preferable that the support member have a flexible bent portion to support the vibrator elastically, the bent portion may be a straight flexible wire or the like.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A vibrating gyroscope, comprising:
   a vibrator having at least two nodes; and
   support members sandwiching said at least two nodes in a vertical direction of the vibrator, and extending in a direction that is perpendicular to the vertical direction and to a longitudinal direction of the vibrator; wherein
   said support members include bent portions, the bent portions of the support members are arranged such that the bent portion of the support member at an upper side of said at least two nodes and the bent portion of the support member at a lower side of said at least two nodes are bent in opposite directions to each other with respect to the longitudinal direction of the vibrator.

2. A vibrating gyroscope according to claim 1, wherein one of the support members is bent in a z-shape, and another of the support members is bent in a reverse z-shape.

3. A vibrating gyroscope according to claim 1, further comprising a frame having an internal hollow space for receiving the vibrator, the support members being connected to the frame to suspend the vibrator within the internal hollow space.

4. A vibrating gyroscope according to claim 1, wherein the vibrator comprises:
   first and second piezoelectric substrates stacked with each other and defining the first and second principal surface of the vibrator, the first and second piezoelectric substrates being polarized in opposite directions of their thickness directions;
   a pair of split electrodes formed on the first principal surface of the first piezoelectric substrate; and
   a common electrode formed on the second principal surface of the second piezoelectric substrate.

5. A vibrating gyroscope, comprising:
   a vibrator having at least a first node and first and second principal surfaces which are parallel with each other; and
   first and second support members made of a thin plate and provided on the first and second principal surfaces of the vibrator, respectively, such that the first and second support members sandwich the at least first node of the vibrator in a vertical direction of the vibrator, the first and second support members extending in a direction that is perpendicular to the vertical direction and to a longitudinal direction of the vibrator; wherein
   the thin plates of the first and second support members are bent in opposite directions to each other with respect to the longitudinal direction of the vibrator.

6. A vibrating gyroscope according to claim 5, wherein each of the support members has a thin flexible portion and an expanded portion which is connected to the thin flexible portion and has a larger area than the thin flexible portion, the expanded portion of each support member being fixed to the vibrator at opposite sides of the at least one node.

7. A vibrating gyroscope according to claim 6, wherein the thin flexible portion of one of the first and second support members is bent in a z-shape, and the other of the first and second support members is bent in a reverse z-shape.

8. A vibrating gyroscope according to claim 5, further comprising a frame having an internal hollow space for receiving the vibrator, the thin flexible portion of each support member being connected to the frame to suspend the vibrator within the internal hollow space.

9. A vibrating gyroscope according to claim 5, wherein the vibrator comprises:

first and second piezoelectric substrates stacked with each other and defining the first and second principal surface of the vibrator, the first and second piezoelectric substrates being polarized in opposite directions of their thickness directions;

first and second split electrodes formed on the first principal surface of the first piezoelectric substrate; and a common electrode formed on the second principal surface of the second piezoelectric substrate.

10. A vibrating gyroscope according to claim 9, wherein each of the first and second split electrodes is divided into at least first and second portions and the expanded portion of the first support members is attached to the first portions of each of the first and second split electrodes, and the expanded portion of the second support member attached to the common electrode.

11. A vibrating gyroscope according to claim 9, further comprising third and fourth support members, wherein the vibrator has a second node and the third and fourth support members support the vibrator such that the third and fourth support members sandwich the second node of the vibrator in the vertical direction of the vibrator.

12. A vibrating gyroscope according to claim 11, wherein each of the first, second, third and fourth support members has a thin flexible portion and an expanded portion which is connected to the thin flexible portion and has a larger area than the thin flexible portion, and each of the first, second, third and fourth support members is fixed to the vibrator at the expanded portion thereof.

13. A vibrating gyroscope according to claim 11, wherein one of the first and second support members is electrically connected to the first split electrode and one of the third and fourth support members is electrically connected to the second split electrode.

14. A vibrating gyroscope according to claim 12, wherein the thin flexible portion of each support member is bent in a z-shape.

15. A vibrating gyroscope according to claim 8, wherein at least one of the support members and at least one end of the frame defining the open hollow space are disposed flush with each other.

16. A vibrating gyroscope comprising:

a vibrator having at least one node; and support members sandwiching said at least one node in a vertical direction of the vibrator; wherein a plane includes said at least one node, and said plane is substantially perpendicular to a longitudinal direction of the vibrator; and said support members are arranged such that one end of the support member at an upper side is fixed at a first position away from said plane with respect to the longitudinal direction of the vibrator and one end of the support member at a lower side is fixed at a second position across said plane from the first position.

17. A vibrating gyroscope according to claim 16, wherein said support members include bent portions, the bent portions of the support members are arranged such that the bent portion of the support member at an upper side of said at least two nodes and the bent portion of the support member at a lower side of said at least two nodes are bent in opposite directions to each other with respect to the longitudinal direction of the vibrator.

18. A vibrating gyroscope according to claim 16, wherein one of the support members is bent in a z-shape, and another of the support members is bent in a reverse z-shape.

19. A vibrating gyroscope according to claim 16, further comprising a frame having an internal hollow space for receiving the vibrator, the support members being connected to the frame to suspend the vibrator within the internal hollow space.

20. A vibrating gyroscope according to claim 16, wherein the vibrator comprises:

first and second piezoelectric substrates stacked with each other and defining the first and second principal surface of the vibrator, the first and second piezoelectric substrates being polarized in opposite directions of their thickness directions;

a pair of split electrodes formed on the first principal surface of the first piezoelectric substrate; and a common electrode formed on the second principal surface of the second piezoelectric substrate.

* * * * *